(12) United States Patent
Kuroda (10) Patent No.: US 8,730,499 B2
(45) Date of Patent: May 20, 2014

(54) IMAGE FORMING APPARATUS, CONTROL METHOD THEREFOR, AND STORAGE MEDIUM

(75) Inventor: Takashi Kuroda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 12/939,890

(22) Filed: Nov. 4, 2010

(65) Prior Publication Data

US 2011/0134469 A1 Jun. 9, 2011

(30) Foreign Application Priority Data

Dec. 4, 2009 (JP) ................................. 2009-276124

(51) Int. Cl.
*G06F 3/12* (2006.01)
*G06K 15/00* (2006.01)

(52) U.S. Cl.
USPC ........................................ 358/1.15; 358/1.18

(58) Field of Classification Search
None
See application file for complete search history.

(56) References Cited

U.S. PATENT DOCUMENTS

| | | | |
|---|---|---|---|
| 2003/0140095 A1* | 7/2003 | Simpson et al. | 709/203 |
| 2003/0225726 A1* | 12/2003 | Simpson et al. | 707/1 |
| 2004/0034654 A1* | 2/2004 | Simpson et al. | 707/103 R |
| 2004/0073632 A1* | 4/2004 | Simpson et al. | 709/220 |
| 2007/0025752 A1* | 2/2007 | Maeda et al. | 399/81 |
| 2007/0058226 A1* | 3/2007 | Lu et al. | 358/527 |
| 2007/0070473 A1* | 3/2007 | Lu et al. | 358/537 |
| 2009/0201543 A1* | 8/2009 | Tonami et al. | 358/1.15 |
| 2010/0020363 A1* | 1/2010 | Yoshida et al. | 358/468 |
| 2010/0027055 A1* | 2/2010 | Mori | 358/1.15 |
| 2010/0027059 A1* | 2/2010 | Ebi | 358/1.15 |
| 2010/0027060 A1* | 2/2010 | Ogino et al. | 358/1.15 |
| 2010/0085602 A1* | 4/2010 | Okada | 358/1.18 |
| 2010/0118338 A1* | 5/2010 | Sakiyama et al. | 358/1.15 |

FOREIGN PATENT DOCUMENTS

| | | |
|---|---|---|
| JP | 10-232524 A | 9/1998 |
| JP | 2001-063155 | 3/2001 |
| JP | 2007-034444 A | 2/2007 |
| JP | 2007-300492 A | 11/2007 |

* cited by examiner

*Primary Examiner* — Satwant Singh
(74) *Attorney, Agent, or Firm* — Canon USA Inc. IP Division (57) ABSTRACT

When a preview image is displayed, an area on which a certain finishing process is executed is automatically enlarged and displayed. A control method for controlling an image forming apparatus including a display unit for previewing print results obtained by printing print information to be printed, the control method comprising: determining a preview position and a preview magnification rate of the print results to be displayed on the display unit, based on a post-processing setting for the print information; and controlling a preview of the print results to be displayed on the display unit, based on the determined preview position and preview magnification rate.

14 Claims, 5 Drawing Sheets

IMAGE FORMING APPARATUS, CONTROL METHOD THEREFOR, AND STORAGE MEDIUM

BACKGROUND OF THE INVENTION

1. Field of the Invention

The present invention relates to an image forming apparatus displaying a preview image, a control method for the image forming apparatus, and a storage medium.

2. Description of the Related Art

Image forming apparatuses such as multifunction peripherals have a preview function to display a preview image of printing results on a display device such as a display. The user can refer to a preview image to check the layout and color of the output image as well as the sharpness of the text in the output image. Thus, the user can reduce failures such as misprints.

Further, conventionally, apparatuses capable of executing a finishing process during a copy operation are available. Examples of the finishing process include a process of punching holes in a document (punching process) and a process of stapling a document (stapling process). When set in such a finishing process, these apparatuses can generate an image of the document on which the finishing process such as a punching process or a stapling process is executed and display the image as a preview image.

Additionally, for example, Japanese Patent Application Laid-Open No. 2001-63155 discusses a technique to create digital data having a pixel number corresponding to physical resolution at the time of printing and to display the data when a user selects an enlargement mode to check the details of a print image while using a preview function. While viewing a preview image, the user manually sets which part of the print image to enlarge and display so that the user can determine in detail whether punch holes or staples overlap the image and whether any missing part is present in an image.

However, according to the conventional techniques, when a user executes a finishing process based on a print setting and enlarges a preview image to check whether any missing part is present in the print image, the user needs to manually set an enlargement position and an enlargement rate repeatedly.

SUMMARY OF THE INVENTION

An image forming apparatus including a display unit for previewing print results obtained by printing print information to be printed, the image forming apparatus further including: a determining unit configured to determine a preview position and a preview magnification rate of the print results to be displayed on the display unit, based on a post-processing setting for the print information; and a control unit configured to control a preview of the print results to be displayed on the display unit, based on the preview position and the preview magnification rate determined by the determining unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
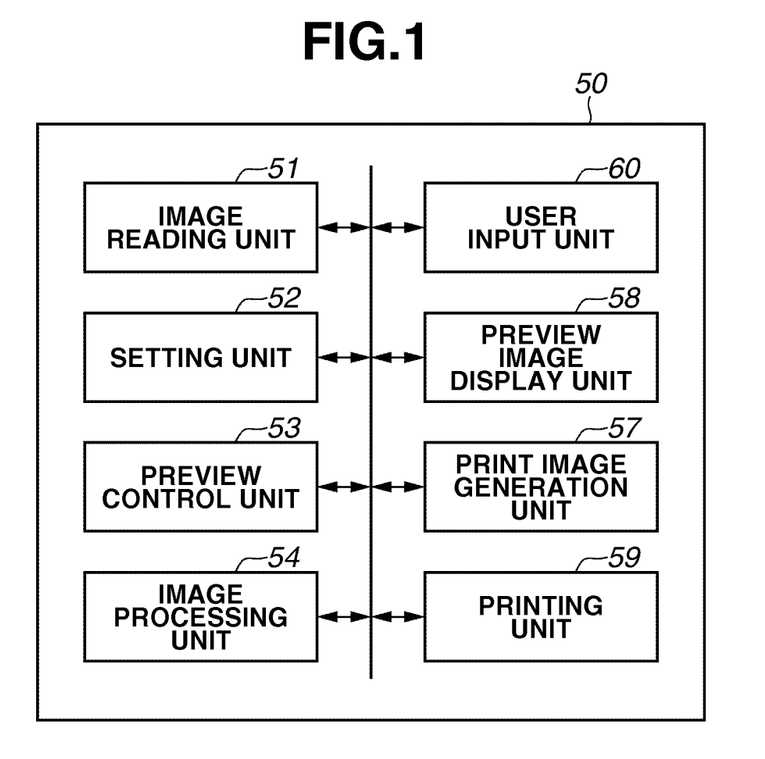
FIG. 1 is a block diagram illustrating a configuration of an image forming apparatus.

FIG. 1 is a block diagram illustrating a configuration of an image forming apparatus according to an exemplary embodiment of the present invention. FIG. 1 only illustrates units relating to the present invention. The units in FIG. 1 are illustrated as functional processing units realized by hardware including a central processing unit (CPU), a read-only memory (ROM), a random access memory (RAM), a hard disk drive (HDD), and the like included in the image forming apparatus 50. The CPU loads a control program stored in the ROM or the like in the RAM and executes the control program. In this way, the CPU comprehensively controls devices (not illustrated) configurating hardware. Further, the CPU executes steps of FIGS. 3 and 5 and controls a preview of print information in accordance with print settings.

As illustrated in FIG. 1, the image forming apparatus 50 includes an image reading unit 51, a setting unit 52, a preview control unit 53, an image processing unit 54, a print image generation unit 57, a preview image display unit 58, a printing unit 59, and a user input unit 60.

The image reading unit 51 reads an image of a document positioned on a document positioning plate or an image of a document conveyed by an automatic document conveyance apparatus. The setting unit 52 stores print settings received from the user input unit 60 and device settings of the image forming apparatus 50. The preview control unit 53 controls an image displayed on the preview image display unit 58. For example, when the CPU (not illustrated) loads a control program in the ROM or the like in the RAM and executes the control program, the preview control unit 53 extracts and enlarges a print image area where a sheet post-processing such as a punching process is executed and causes the preview image display unit 58 to display the enlarged image.

The image processing unit 54 executes various types of image processing. For example, the image processing unit 54 generates image data for a preview from an image read by the image reading unit 51. The user input unit 60 includes an operation unit equipped with a touch panel and receives user operations. The preview image display unit 58 includes, for example, a liquid crystal display unit, and displays an operation screen and various messages. The user input unit 60 and the preview image display unit 58 may be separated or integrated. The print image generation unit 57 generates print data to be printed by the printing unit 59, based on the image data about the document read by the image reading unit 51. The printing unit 59 executes a print operation on a sheet fed by a sheet feeding unit and discharges the sheet to a sheet discharging unit.

Figure 2:
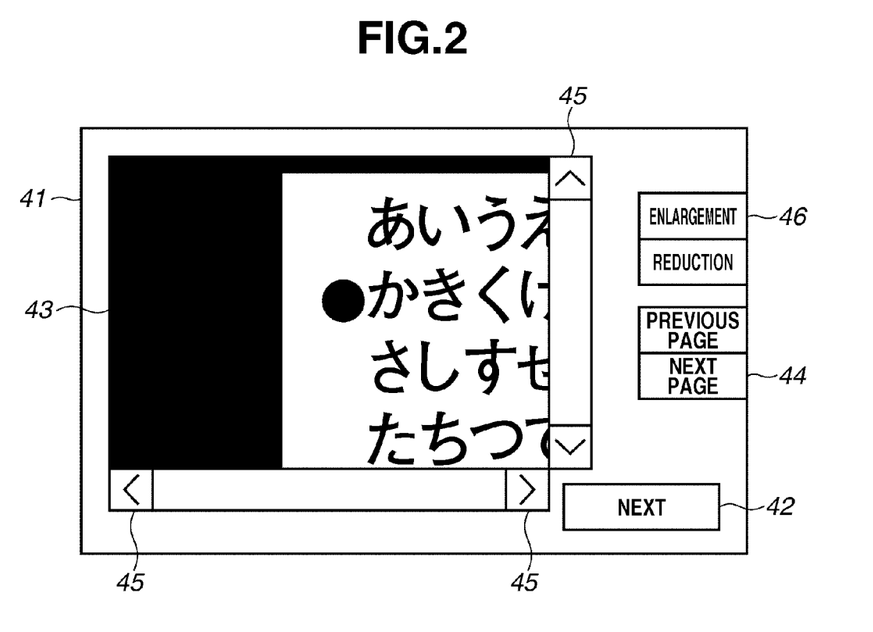
FIG. 2 illustrates a configuration of a preview image display unit of FIG. 1.

FIG. 2 illustrates a configuration of a preview image display unit of FIG. 1. As illustrated in FIG. 2, a preview screen 41 includes a next button 42, a preview display area 43, page change buttons 44, scroll buttons 45, and enlargement/reduction buttons 46.

The preview display area 43 is a screen area displaying a preview image. The user can change the display area of a preview image by pressing any one of the scroll buttons 45 and the enlargement/reduction buttons 46. When a file has a plurality of pages to be previewed, the user can use the page change buttons 44 to switch the pages to be previewed. When the user enlarges a preview image and the preview screen 41 cannot display the entire preview image, the user can use the scroll buttons 45 to switch the display area of the preview image.

The user can switch the display magnification rate of a preview image with the enlargement/reduction buttons 46. Assuming that the preview control unit 53 displays the entire image on the preview display area 43 when the magnification rate is 100%, for example, if the user switches the magnification rate to 200%, 400%, and 800%, the preview control unit 53 accordingly enlarges the entire image and displays 50%, 25%, and 12.5% of the entire image, respectively. The user may set other magnification rates such as 50%, 75%, 100%, 125%, and 150% to switch the magnification rate. Further, the user uses the next button 42 as a preview coordinate change button. Namely, when a preview image includes plural sets of preview coordinates that are automatically enlarged, the user uses the next preview button 42 to change preview coordinates that are enlarged and displayed.

Figure 3:
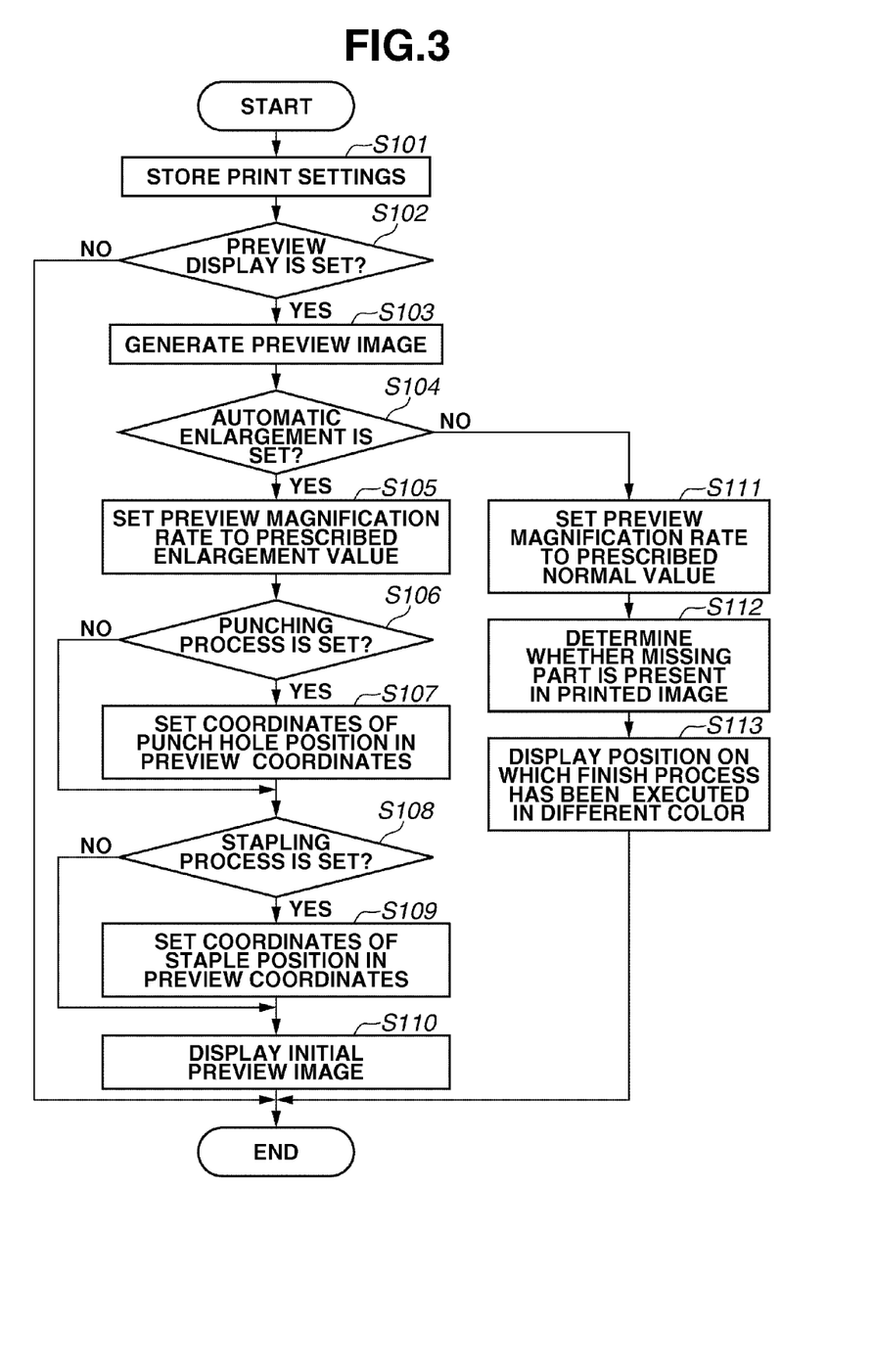
FIG. 3 is a flow chart illustrating a control method for the image forming apparatus.

FIG. 3 is a flow chart illustrating a control method for the image forming apparatus 50 according to the exemplary embodiment. This exemplary embodiment is an example where an image of an area on which sheet processing is executed is automatically enlarged and previewed. More specifically, the preview control unit 53 automatically determines a preview position and a preview magnification rate of an image to be enlarged and displayed based on print settings for print information to be printed and controls a preview of the print information. The print setting includes: a finishing process setting such as a punching process setting and a stapling process setting; a preview display setting; and a setting of enabling or disabling automatic preview enlargement.

While the CPU of the image forming apparatus 50 executes the present processing by loading a module that functions as the preview control unit 53 from the ROM to the RAM and executing the module, for ease of description, the present processing will be described as functional processing of the preview control unit 53. In addition, in the exemplary embodiment, the image forming apparatus 50 controls a copy job by causing the image reading unit 51 to read a document and the printing unit 59 to print image data of the document based on print settings received via the user input unit 60. Hereinafter, this control operation of the image forming apparatus 50 will be described.

The user prepares a document, uses the user input unit 60 to input print settings such as a print sheet size, a print density, a set number of print copies, and post-processing (punching process or stapling process), and press a start key, thereby giving the image forming apparatus 50 instructions to execute a copy job. As a print setting, the user can specify the image forming apparatus 50 to set a preview display via a user input unit 60. If the user sets a preview display, the preview control unit 53 of the image forming apparatus 50 causes the preview image display unit 58 to automatically display a preview image before causing the printing unit 59 to print the image data obtained by causing the image reading unit 51 to read a document.

First, in step S101, the image forming apparatus 50 receives print settings (corresponding to the above print settings) from the user and stores the print settings in the setting unit 52 configured with the RAM or HDD. Next, in step S102, the preview control unit 53 refers to the print settings stored in the setting unit 52 to determine whether a preview display is set. If the preview control unit 53 determines that a preview display is not set (NO in step S102), the preview control unit 53 ends this flow of displaying a preview image.

On the other hand, if the preview control unit 53 determines that a preview display is set (YES in step S102), in step S103, the preview control unit 53 instructs the image processing unit 54 to generate a preview image. Then the image processing unit 54 generates the preview image data that is displayed initially, based on the document image data read by the image reading unit 51.

Next, in step S104, the preview control unit 53 refers to the print settings stored in the setting unit 52 to determine whether automatic enlargement of the preview image is set. If the preview control unit 53 determines that automatic enlargement of the preview image is set (YES in step S104), in step S105, the preview control unit 53 sets the preview magnification rate to a prescribed enlargement value. The user can determine the prescribed enlargement value in advance. For example, in advance, the user can set a magnification rate 250% or 300% with reference to the image size of the preview image data generated in step S103.

Additionally, the preview control unit 53 sets preview coordinates based on the print settings stored in the setting unit 52. Next, in step S106, the preview control unit 53 determines whether a punching process is set as a print setting. If the preview control unit 53 determines that a punching process is not set as a print setting (NO in step S106), the operation proceeds to step S108.

On the other hand, if the preview control unit 53 determines that a punching process is set as a print setting (YES in step S106), in step S107 the preview control unit 53 sets coordinates of a punch-hole position in the preview coordinates. If a plurality of punch holes are formed, the image forming apparatus 50 sets coordinates of the plurality of punch-hole positions in the preview coordinates. The image forming apparatus 50 uses coordinates of the center of a punch hole as the coordinates of a punch-hole position. Capability of a post-processing apparatus included in the image forming apparatus 50 determines the size of a punch hole formed by the punching process. For example, the image forming apparatus 50 may store information about the diameter of a projection used to punch a hole in a sheet in the RAM, HDD, or the like. Based on the information, the image forming apparatus 50 may synthesize the punch hole and the preview image and display the synthesized image data. If the post-processing apparatus is a replaceable optional apparatus, the image forming apparatus 50 may acquire information about the diameter of a projection used to punch a hole in a sheet from the replaceable optional apparatus and store the information in the RAM, HDD, or the like. In this way, the preview control unit 53 sets coordinates of a punch-hole position to the preview coordinates.

Next, in step S108, the preview control unit 53 determines whether a stapling process is set as a print setting stored in the setting unit 52. If the preview control unit 53 determines that a stapling process is set as a print setting (YES in step S108), in step S109 the preview control unit 53 sets coordinates of a staple position in the preview coordinates. The preview control unit 53 uses coordinates of the center of a staple as the coordinates of a staple position.

Next, in step S110, the preview control unit 53 causes the preview image display unit 58 to display the initial preview image with the preview magnification rate set in step S105 and the preview coordinates acquired in S107 at the center of the screen. If in step S107 the preview control unit 53 determines no punching process setting and set no preview coordinates, the preview image display unit 58 displays image data with the coordinates acquired in step S109 at the center of the screen.

If the preview control unit 53 determines no preview coordinates in steps S107 and S109 and if the user requests an enlargement preview, the preview control unit 53 notifies the user that there is no preview image to be enlarged. Alternatively, the preview control unit 53 may cause the preview image display unit 58 to display prescribed coordinates of a preview image (the top left corner of image data, for example).

Figure 5:
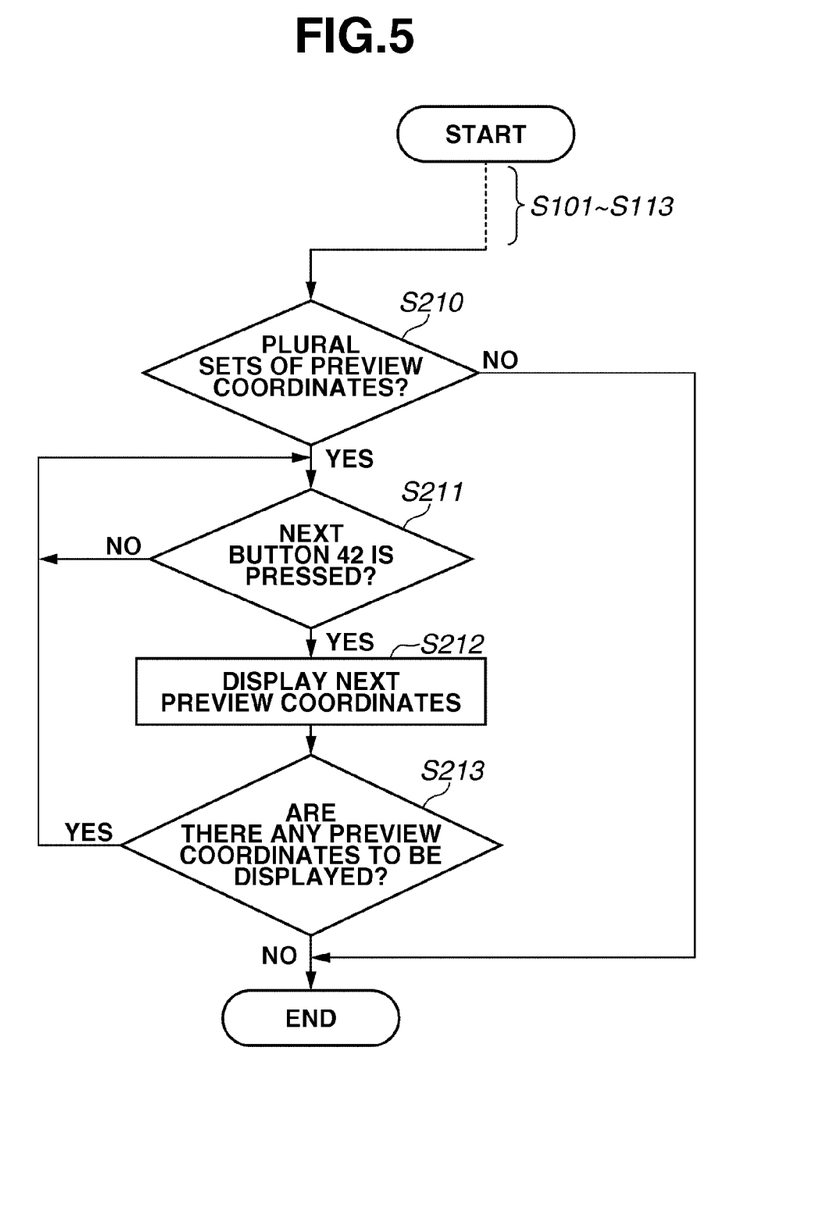
FIG. 5 is a flow chart illustrating a control method for the image forming apparatus.

If plural sets of coordinates to be previewed are present, after causing the preview image display unit 58 to display the screen of FIG. 2, based on the procedure illustrated in FIG. 5, the preview control unit 53 enables the next button 42 and receives a preview coordinate change request from the user. If the preview image display unit 58 receives a preview coordinate change request from the user, the preview image display unit 58 executes a preview image display sequentially changing the plural sets of preview coordinates.

On the other hand, in step S104, if the preview control unit 53 determines that automatic enlargement of a preview image is not set (NO in step S104), in step S111 the preview control unit 53 sets the preview magnification ratio to a prescribed normal value. The prescribed normal value signifies a normal magnification rate at which the entire sheet is displayed, based on a display area in which a preview image is displayed and a sheet size set by print information to be printed.

Next, the image processing unit 54 compares the image of the document read by the image reading unit 51 with the position on which a finishing process based on the print settings is executed, to determine whether any missing part is present in the printed image. For example, if the area of the printed image overlaps a punch-hole position, the image processing unit 54 determines that a missing part is present in the printed image.

Figure 4:
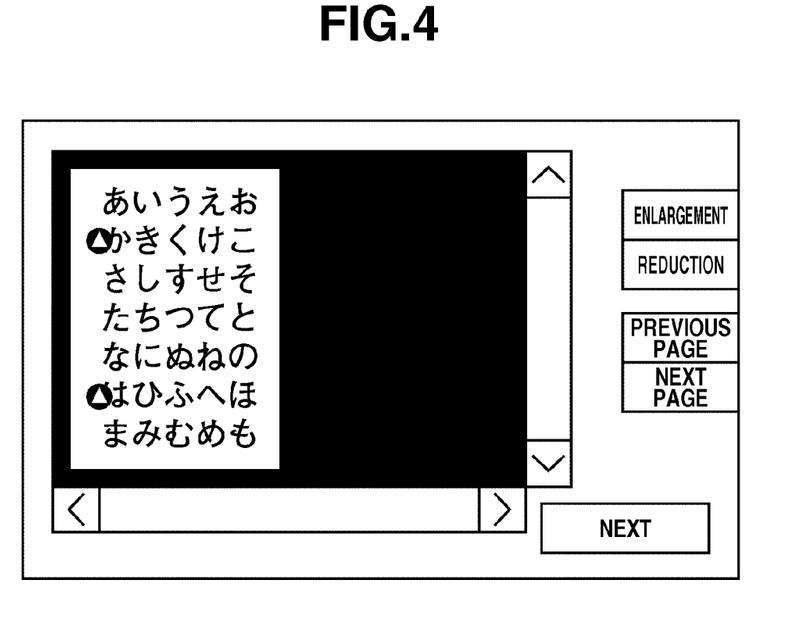
FIG. 4 illustrates a user interface (UI) displayed on the preview image display unit.

If the image processing unit 54 determines that a missing part is present in the printed image, as illustrated in FIG. 4, in step S112 the image processing unit 54 generates a preview image including a triangular mark at the corresponding position of finishing process on the preview screen 41 of the preview image display unit 58. Next, in step S113, the preview image display unit 58 displays a preview image so that the entire print results are displayed based on prescribed coordinates, as illustrated in FIG. 4. The image forming apparatus 50 ends the processing.

In step S113, since the preview image display unit 58 displays a preview image at a magnification rate based on a prescribed normal value, the user can view an image of the entire print results. By rendering the area on which a finishing process is executed, the preview image display unit 58 displays a preview image so that the user can distinguish the part on which the finishing process is executed.

In the exemplary embodiment, the user explicitly enables and disenables automatic enlargement of a preview by using the user input unit 60. However, to prevent a finishing process such as a punching process or a stapling process from causing a missing part in the printed image to occur, there are cases where the user sets an image shift as a print setting.

In such case, it is more bothersome for the user to view a punch-hole position or a staple position that is automatically enlarged. Thus, if the user enables a print setting to prevent occurrence of a missing part in a print image, the image forming apparatus 50 may accordingly disable the automatic preview enlargement. Such print setting that prevents occurrence of a missing part in a print image is another print setting that avoids an impact caused by one print setting. For example, when one setting is a punching process, another setting shifts an output print area and prevents occurrence of a missing part in the image.

FIG. 4 illustrates a user interface (UI) displayed on the preview screen 41 of the preview image display unit 58 in FIG. 2. The image processing unit 54 generates the screen in step S112 of the preview image display flow of FIG. 3, and the screen displays an example of a preview image clearly displaying a missing part caused by a finishing process.

The display pattern is not limited to the display example illustrated in FIG. 4. As long as the user can recognize a missing part in an image, other patterns may be used. For example, punch-hole positions or staple positions may be displayed in a different color or blinked. Alternatively, an audio output may be used to notify the user of a missing part in an image.

FIG. 5 is a flow chart illustrating a control method for the image forming apparatus 50 according to the exemplary embodiment. The method is used when the preview image display unit 58 automatically enlarges and previews an image area on which a sheet processing is executed and when plural sets of coordinates to be previewed are present.

While the CPU of the image forming apparatus 50 executes the present processing by loading a module that functions as the preview control unit 53 from the ROM to the RAM and executing the module, for ease of description, the present processing will be described as functional processing of the preview control unit 53. Since steps S101 to S113 of FIG. 5 are the same as those of FIG. 3, the description thereof will be omitted. Thus, steps S210 to S213 will be hereinafter described.

In step S210, if the preview control unit 53 determines that plural sets of preview coordinates are present (YES in step S210), the operation proceeds to step S211. In step S211, if the user has pressed the next preview button 42, the preview control unit 53 receives a preview coordinate change request.

Upon receiving the preview coordinate change request, in step S212 the preview control unit 53 changes the preview coordinates to display the next preview image on the preview image display unit 58. Next, in step S213, if the preview control unit 53 determines that there are still preview coordinates to be displayed (YES in step S213), the preview control unit 53 repeats steps S211 and S212. If not (NO in step S213), the preview control unit 53 ends the processing. In step S210, if the preview control unit 53 determines that plural sets of preview coordinates are not present (NO in step S210), the preview control unit 53 ends the processing.

In the above exemplary embodiment, the preview control unit 53 ends the processing after previewing image data. However, subsequently, when the user presses the start key, the CPU of the image forming apparatus 50 causes the printing unit 59 to print the previewed image data and ends the processing. The CPU of the image forming apparatus 50 controls printing of image data and execution of post-processing, based on the print settings made by the user. Further, during display of a preview image, if the CPU of the image forming apparatus 50 receives instructions to shift the image data, the CPU of the image forming apparatus 50 shifts the image data by an amount set by the user and prints the image data.

In the above exemplary embodiment, in step S110, the preview image display unit 58 first displays an enlarged preview image. However, alternatively, the preview image display unit 58 may first display a preview image of the entire sheet. Next, based on user instructions, the preview image display unit 58 may enlarge positions on which a post-processing is executed and display the positions sequentially.

In addition, in the above exemplary embodiment, punching and stapling process settings are used as examples of the post-processing settings, the post-processing settings are not limited to such examples. The post-processing settings include other settings as long as they affect a printed sheet.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-276124 filed Dec. 4, 2009, which is hereby incorporated by reference herein in its entirety.

What is claimed is:

1. An image forming apparatus controlling a display unit configured to display a preview image for previewing print results obtained by printing print information on a sheet, the image forming apparatus comprising:
a magnification rate setting unit configured to allow a user to set a magnification rate to enlarge a preview image;
a determining unit configured to determine a preview position of the print results to be previewed on the display unit, based on a position of a post-processing to be executed on the sheet; and
a control unit configured to control a preview image for previewing a part of the print results which is enlarged based on the magnification rate set by the user to be displayed on the display unit, based on the preview position determined by the determining unit.

2. An image forming apparatus according to claim 1, wherein the post-processing is at least one of a punching processing and a stapling processing.

3. An image forming apparatus according to claim 1, wherein in a case where first and second types of post-processing is executed on the sheet, the determining unit determines a first preview position of the print results based on a position of the first type of post-processing, and determines a second preview position of the print results based on a position of the second type of post-processing, and
the control unit controls the preview image to be displayed on the display unit based on the determined first preview position, and then controls the preview image to be displayed on the display unit based on the determined second preview position.

4. An image forming apparatus according to claim 3, further comprising:
an instruction unit configured to receives a request for changing the preview position from a user,
wherein, upon receiving the request, the control unit controls the preview image to be displayed on the display unit based on the determined second preview position.

5. An image forming apparatus according to claim 1, further comprising:
an image reading unit configured to read an image;
an image processing unit configured to generate image data for the preview image from the image read by the image reading unit.

6. An image forming apparatus according to claim 5, further comprising:
a printing unit configured to print the print information which is generated from the image read by the image reading unit, on the sheet.

7. An image forming apparatus according to claim 5, further comprising:
a post-processing apparatus configured to execute the post-processing on the sheet.

8. An image forming apparatus according to claim 1, further comprising,
a judging unit configured to judge whether a setting of automatically enlarging a preview image is valid or invalid,
wherein, in a case where the judging unit judges that the setting of automatically enlarging the preview image is invalid, the magnification rate setting unit sets the magnification rate of the preview image to be displayed on the display unit to a normal magnification rate.

9. An image forming apparatus according to claim 8, wherein, in a case where the judging unit judges that the setting of automatically enlarging the preview image is valid, the control unit causes the display unit to display the preview image for previewing a part of the print results, based on the position of the post processing.

10. An image forming apparatus according to claim 1, wherein in a case a preview image for previewing the entire print results is displayed on the display unit and an area on which the post-processing based on a post-processing setting is executed overlaps an area where the print information is printed, the control unit causes the display unit to display the preview image for previewing the entire print results so that a user can recognize that the area on which the post-processing based on the post-processing setting is executed overlaps the area where the print information is printed.

11. An image forming apparatus according to claim 10, wherein the control unit causes the display unit to display the preview image for previewing the entire print results which includes a mark for indicating the area on which the post-processing is executed.

12. An image forming apparatus according to claim 10, wherein the control unit causes the display unit to display the preview image previewing the entire print results in which the area of the post-processing is displayed in a predetermined color or is blinked.

13. A control method for controlling a display unit configured to display a preview image for previewing print results obtained by printing print information on a sheet, the control method comprising:
receiving a user instruction for set a magnification rate to enlarge a preview image;

determining a preview position of the print results to be previewed on the display unit, based on a position of a post-processing to be executed on the sheet; and controlling a preview image for previewing a part of the print results which is enlarged based on the magnification rate set by the user instruction to be displayed on the display unit, based on the determined preview position.

14. A non-transitory computer readable storage medium for storing a computer program for controlling a display unit configured to display a preview image for previewing print results obtained by printing print information on a sheet, the computer program comprising:

a code to allow a user to set a magnification rate to enlarge a preview image;

a code to determine a preview position of the print results to be previewed on the display unit, based on a position of a post-processing to be executed on the sheet; and a code to control a preview image for previewing a part of the print results which is enlarged based on the magnification rate set by the user to be displayed on the display unit, based on the determined preview position.

* * * * *